US010271008B2

(12) United States Patent
Breternitz et al.

(10) Patent No.: US 10,271,008 B2
(45) Date of Patent: Apr. 23, 2019

(54) ENHANCED RESOLUTION VIDEO AND SECURITY VIA MACHINE LEARNING

(71) Applicant: Advanced Micro Devices, Inc., Sunnyvale, CA (US)

(72) Inventors: Mauricio Breternitz, Austin, TX (US); John E. Owen, Jr., Driftwood, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 2 days.

(21) Appl. No.: 15/485,071

(22) Filed: Apr. 11, 2017

(65) Prior Publication Data

US 2018/0295320 A1   Oct. 11, 2018

(51) Int. Cl.
*H04N 7/01* (2006.01)
*H04L 29/06* (2006.01)
*G06T 3/40* (2006.01)

(52) U.S. Cl.
CPC ............. *H04N 7/0117* (2013.01); *G06T 3/40* (2013.01); *H04L 63/0428* (2013.01); *H04L 2209/34* (2013.01)

(58) Field of Classification Search
CPC .......... H04N 7/0117; H04N 9/47; H04N 7/18; H04L 63/0428; H04L 2209/34; G06K 9/32; G06K 9/00; G06K 9/62; G06K 9/6215
USPC ................ 382/156–159, 118, 224, 276, 299; 348/441, 63, 561
See application file for complete search history.

(56) References Cited

U.S. PATENT DOCUMENTS

| 5,842,194 A | * | 11/1998 | Arbuckle | ............. | G06K 9/6857 |
| | | | | | 382/224 |
| 6,917,703 B1 | * | 7/2005 | Steffens | ............. | G06K 9/00281 |
| | | | | | 382/118 |
| 7,295,687 B2 | * | 11/2007 | Kee | .................... | G06K 9/00281 |
| | | | | | 340/5.53 |

(Continued)

OTHER PUBLICATIONS

Tai et al., "Image Super-Resolution via Deep Recursive Residual Network", 2017 IEEE Conference on Computer Vision and Pattern Recognition (CVPR), Jul. 21-26, 2017, 9 pages, http://cvlab.cse.msu.edu/pdfs/Tai_Yang_Liu_CVPR2017.pdf. [Retrieved Mar. 6, 2018].

(Continued)

*Primary Examiner* — Trang U Tran
(74) *Attorney, Agent, or Firm* — Meyertons Hood Kivlin Kowert and Goetzel PC; Rory D. Rankin

(57) ABSTRACT

Systems, apparatuses, and methods for enhanced resolution video and security via machine learning are disclosed. A transmitter reduces a resolution of each image of a videostream from a first, higher image resolution to a second, lower image resolution. The transmitter generates a set of parameters for programming a neural network to reconstruct a version of each image at the first image resolution. Then, the transmitter sends the images at the second image resolution to the receiver, along with the first set of parameters. The receiver programs a neural network with the first set of parameters and uses the neural network to reconstruct versions of the images at the first image resolution. The transmitter can send the first set of parameters to the receiver via a secure channel, ensuring that only the receiver can decode the images from the second image resolution to the first image resolution.

20 Claims, 7 Drawing Sheets

(56) References Cited

U.S. PATENT DOCUMENTS

| | | | | |
|---|---|---|---|---|
| 7,941,002 B2* | 5/2011 | Samadani | ............ | G06T 3/0012 |
| | | | | 348/240.2 |
| 2014/0072242 A1* | 3/2014 | Wei | ............ | H04N 19/176 |
| | | | | 382/299 |
| 2017/0287109 A1* | 10/2017 | Tasfi | ............ | G06T 3/4046 |

OTHER PUBLICATIONS

Greaves et al., "Multi-Frame Video Super-Resolution Using Convolutional Neural Networks", 2016, 9 pages, http://cs231n.stanford.edu/reports/2016/pdfs/212_Report.pdf. [Retrieved on Mar. 6, 2018].

Dong et al., "Image Super-Resolution Using Deep Convolutional Networks", IEEE Transactions on Pattern Analysis and Machine Intelligence, Jul. 31, 2015, pp. 295-307, vol. 38, Issue 2, https://arxiv.org/pdf/1501.00092.pdf. [Retrieved on Mar. 6, 2018].

Radford et al., "Unsupervised Representation Learning with Deep Convolutional Generative Adversarial Networks", Jan. 7, 2016, 16 pages, https://arxiv.org/pdf/1511.06434.pdf. [Retrieved Mar. 6, 2018].

* cited by examiner

ENHANCED RESOLUTION VIDEO AND SECURITY VIA MACHINE LEARNING

BACKGROUND

Description of the Related Art

The bandwidth requirements of digital video streaming continue to grow with time. Various applications benefit from video compression which requires less storage space for archived video information and/or less bandwidth for the transmission of the video information. Accordingly, various techniques to improve the quality and accessibility of the digital video have been developed. For example, H.264, a video compression scheme, or codec, has been adopted by the Motion Pictures Expert Group (MPEG) to be the video compression scheme for the MPEG-4 format for digital media exchange. H.264 is MPEG-4 Part 10. H.264 was developed to address various needs in an evolving digital media market, such as relative inefficiency of older compression schemes, the availability of greater computational resources, and the increasing demand for High Definition (HD) video, which requires the ability to store and transmit about six times as much data as required by Standard Definition (SD) video. While consumers may generally prefer viewing video at a higher resolution than a lower resolution, the bandwidth consumed by transmitting a higher definition (e.g., HD) video may not be desirable or even possible in certain cases. For example, if network congestion is relatively high, transmitting a high definition video may result in undesirable buffering and pauses in the display of the video on the receiving end that viewers find highly objectionable. In other cases, consumers often pay for the bandwidth they consume. In such cases, transmitting high definition video can rapidly increase costs to consumers or otherwise consume their allocation for a given time period. Accordingly, improved methods and mechanisms are desired for managing the transmission of video and other content.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
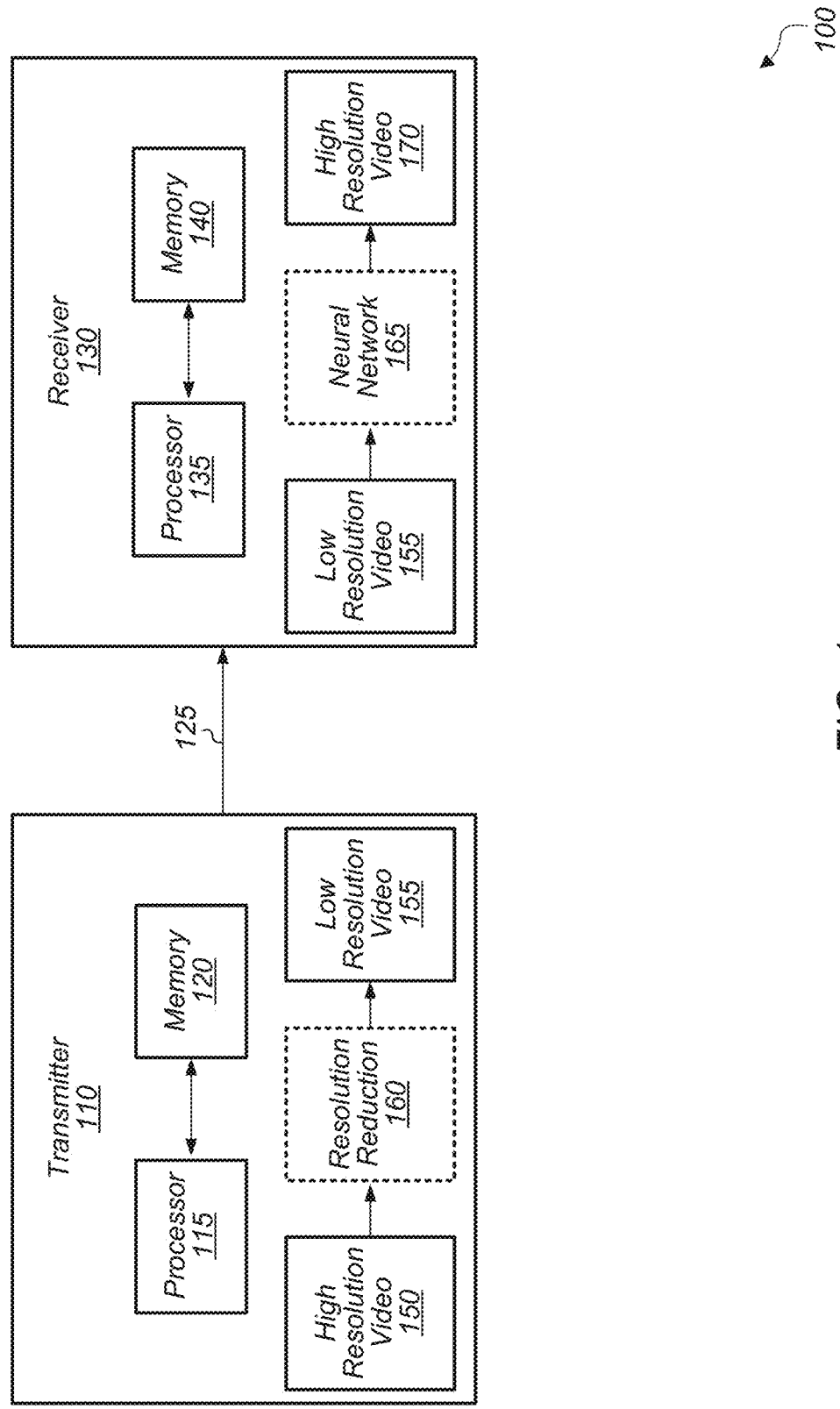
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for enhanced resolution video and security via machine learning are disclosed herein. In one embodiment, a system includes at least a transmitter coupled to a receiver. For example, each of the transmitter and receiver may include a network interface configured to communicate via a network (e.g., the Internet, etc.). Therefore, even when not communicating with one another, we may say they are "coupled" to one another. In one embodiment, the transmitter is configured to reduce a resolution of each image of a videostream from a first image resolution to a second image resolution. Then, the transmitter conveys the images of the video sequence with the second image resolution to the receiver. The transmitter is also configured to convey, to the receiver, a first set of parameters for programming a neural network.

In one embodiment, the receiver is configured to receive the first set of parameters and the images of the second image resolution. The receiver is configured to program a neural network with the first set of parameters. Then, the receiver is configured to process each image in the second image resolution using the neural network to reconstruct the image with the first image resolution. This technique also enables secure communication between the transmitter and the receiver. The transmitter can send the first set of parameters to the receiver via a secure channel, ensuring that only the receiver can decode the images from the second image resolution to the first image resolution.

In one embodiment, the transmitter is configured to partition an image into a plurality of regions. In one embodiment, the transmitter identifies regions within the image that have similar features and that would benefit from being processed separately by separate neural networks. Then, the transmitter generates a different set of neural network parameters for each region of the plurality of regions. Next, the transmitter conveys the different sets of parameters, for each region of the plurality of regions, to the receiver. Also, the transmitter conveys, to the receiver, indications of how the image has been partitioned into the plurality of regions. After the receiver receives the multiple sets of parameters, the receiver is configured to program a plurality of neural networks, with each neural network programmed by a separate set of parameters corresponding to a different region of the plurality of regions. Then, the receiver processes each region of the plurality of regions with a separate neural network to reconstruct the region in the first image resolution. Next, the receiver combines the regions together into a single image at the first image resolution.

Referring now to FIG. 1, a block diagram of one embodiment of a computing system 100 is shown. In one embodiment, system 100 includes transmitter 110 coupled to receiver 130 over channel 125. Channel 125 is representative of any type of network, bus, or other type of connection. Transmitter 110 and receiver 130 are representative of any type of computing devices or computing systems (e.g., set-top box, server, computer, television). Transmitter 110 includes at least processor 115 coupled to memory 120.

Similarly, receiver 130 includes at least processor 135 coupled to memory 140. Each of processors 115 and 135 are representative of any number and type of processing units. Each of memory 120 and 140 are representative of any number and type of memory devices. In one embodiment, processor 135 is a graphics processing unit (GPU). In other embodiments, processor 135 can be other types of processing units (e.g., digital signal processor (DSP), field programmable gate array (FPGA), application specific integrated circuit (ASIC)). Memory 120 and 140 can be implemented with any of various types of memory, including, but not limited to, Dynamic Random Access Memory (DRAM), Static Random Access Memory (SRAM), NAND Flash memory, NOR flash memory, Ferroelectric Random Access Memory (FeRAM), or others.

In one embodiment, transmitter 110 uses resolution reduction unit 160 to reduce the resolution of higher resolution video 150 to generate a lower resolution video 155 (i.e., to reduce the resolution of a given video). In one embodiment, processor 115 is configured to convert higher resolution video 150 into a lower resolution video 155. In one embodiment, processor 115 is also configured to generate a set of parameters for programming neural network 165 of receiver 130. In one embodiment, the set of parameters can include at least a plurality of weights to be applied to the links between neurons of neural network 165. The set of parameters are used to increase the resolution of the received video 155 using neural network 165. In one embodiment, processor 115 includes a neural network which is trained to convert lower resolution videos to higher resolution videos. After the neural network has been trained, processor 115 can utilize the settings of the trained neural network to generate the set of parameters for programming neural network 165 of receiver 130. Processor 115 is configured to convey lower resolution video 155 and the set of parameters to receiver 130 over channel 125. By conveying the lower resolution video 155 over the channel 125, less bandwidth may be consumed as compared to conveying the higher resolution video 150.

Receiver 130 is configured to program neural network 165 with the set of parameters received from transmitter 110. In one embodiment, neural network 165 is implemented using processor 135 (e.g., using hardware and/or software). Receiver 130 is also configured to convert lower resolution video 155 to higher resolution video 170 using the programmed neural network 165. It is noted that higher resolution video 170 may not be exactly the same as high resolution video 150, but an approximation of the high resolution video 150 is attained via the use of neural network 165.

In some embodiments transmitter 110 does not itself perform resolution reduction. Rather, the resolution reduction of a video may have been performed elsewhere and transmitter 110 receives the already reduced video content. Further, in various embodiments, transmitter 110 does not train a neural network and does not determine parameters to use for a neural network. Such training and determining of parameters for a trained neural network may be performed by another entity not shown. In some embodiments, transmitter 110 may be coupled to a source of video content (e.g., a large library of video content). In various embodiments, transmitter 110 (or some other entity) is configured to train a neural network using video content from the video content source. For example, a video content library may include a high definition version of a given video title. The transmitter or other entity may produce a lower resolution version of the title and using both the high(er) and lower resolution titles train the neural network. Once the neural network has been satisfactorily trained (e.g., to produce an acceptable higher resolution version of the title using the lower resolution version of the title), parameters of the trained neural network are stored and associated with the title.

When the given title is to be conveyed to the receiver 130, either of the versions may be conveyed depending on various circumstances (e.g., available bandwidth, price paid for the title, user setting associated with the receiver, etc.). If the lower resolution version is conveyed, the neural network parameters are also conveyed along with some indication that the lower resolution version of the title may be processed using the parameter (if a corresponding neural network is available on the receiving end). In some embodiments, the receiver may include software (and/or hardware) that implements the neural network and can use the parameters to produce a higher resolution version of the given title from the received lower resolution version. As one example, the receiver may be a mobile device, such as a tablet or smart phone, and the neural network may be incorporated into an application stored on the device. In some embodiments, if the receiving device does not include the neural network, the received lower resolution video may be displayed according to its received resolution. In other embodiments, in response to receiving the video (or when requesting the video), the receiver may provide a prompt for the user indicating that an application with the neural network can be downloaded. In some embodiments, the receiver 130 may be configured to display the processed video content right away (e.g., in near real time given network, processing, and other delays). In other embodiments, the receiver may be configured to store (e.g., record) the received content for later viewing. In such embodiments, the received video content may be processed by a neural network when the content is received or at a later time. In either case, the processed video content may then be stored for later viewing. These and other embodiments are possible and are contemplated.

In other embodiments, a neural network may be trained on video content that does not correspond to the given video content being conveyed by the transmitter 110. For example, a neural network may have been trained on one or more video titles. Based on this training, the neural network may be able to process a different (relatively low resolution) video title and arrive and acceptable results (i.e., a viewer may prefer the results over the appearance of the original lower resolution video content). In these embodiments, transmitter may transmit the parameters of the neural network even though they do not directly correspond to the video content being conveyed. In other embodiments, the receiver in this, and other embodiments described herein, may already have or otherwise obtain neural network parameters. In such cases, the transmitter 110 would not convey the parameters to the receiver 130 with the request video content.

Figure 2:
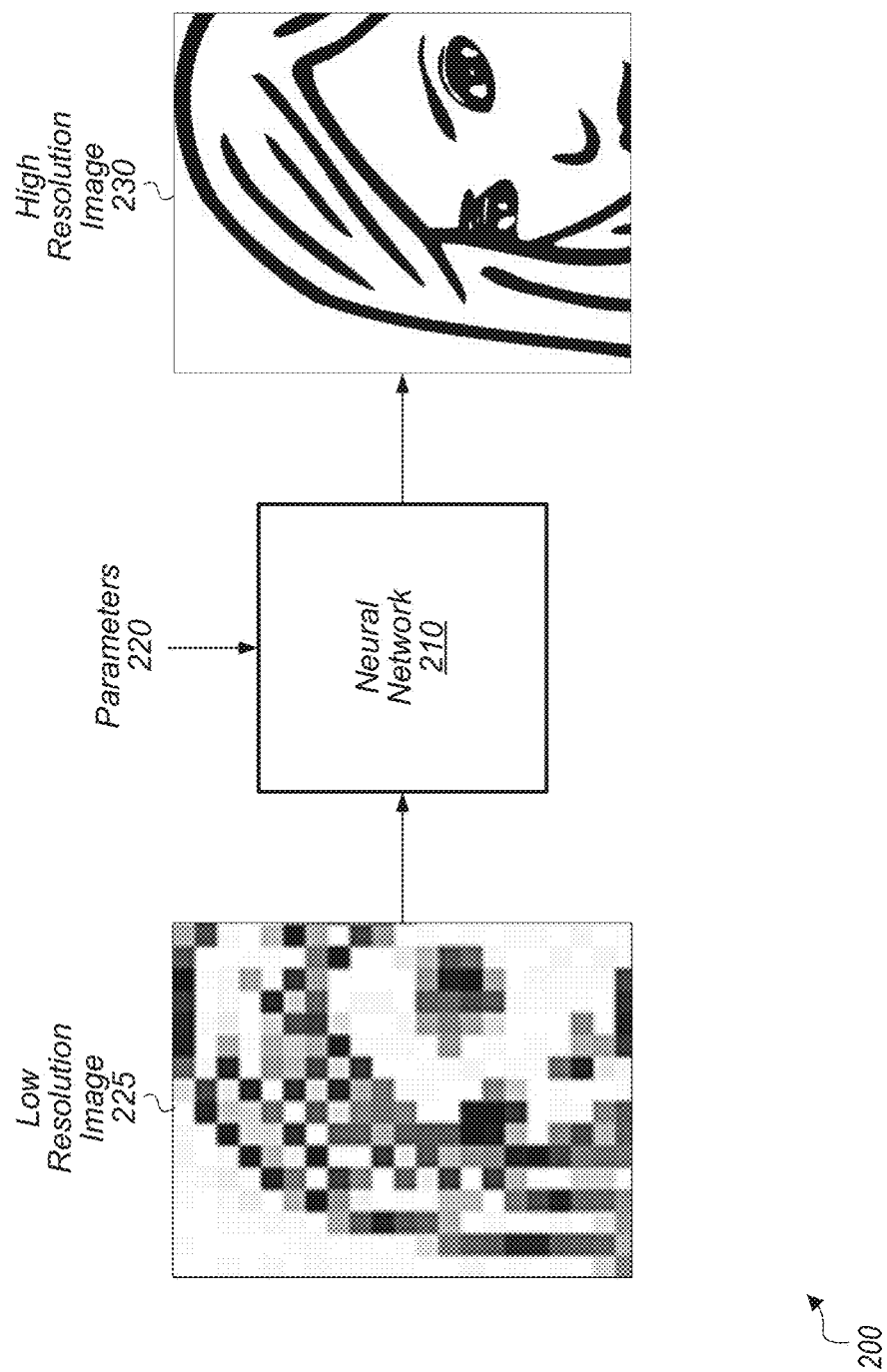
FIG. 2 is a block diagram of one embodiment of a receiver using a neural network to reconstruct a high resolution image.

Turning now to FIG. 2, a block diagram of one embodiment of a receiver 200 using a neural network to reconstruct a high resolution image 230 is shown. Receiver 200 is configured to reconstruct high resolution image 230 from low resolution image 225 using neural network 210 which is programmed by parameters 220. In one embodiment, a transmitter (e.g., transmitter 110 of FIG. 1) reduces the resolution of an image and sends the resultant low resolution image 225 to receiver 200. The transmitter also sends, to receiver 200, parameters 220 for programming neural network 210. In one embodiment, parameters 220 include weight parameters to be applied to links between neurons of neural network 210. Neurons can also be referred to as elementary computing units of neural network 210. The neurons apply activation functions to the inputs to produce outputs which are processed by other neurons. Neural network 210 includes any number of layers of neurons, depending on the embodiment. For example, in one embodiment, neural network 210 includes an input layer, output layer, and one or more intermediate hidden layers between the input and output layers.

After receiver 200 receives the parameters 220, receiver 200 utilizes the parameters 220 to program neural network 210. As used herein, "programming" neural network 210 with parameters 220 involves applying the weight parameters to the activation functions of the neurons of the various layers of neural network 210. Once neural network 210 has been programmed, neural network 210 receives low resolution image 225 as an input and then generates high resolution image 230 as an output. In one embodiment, low resolution image 225 is representative of a single frame of a videostream, and each frame of the videostream can be converted by neural network 210 into a high-resolution frame.

Figure 3:
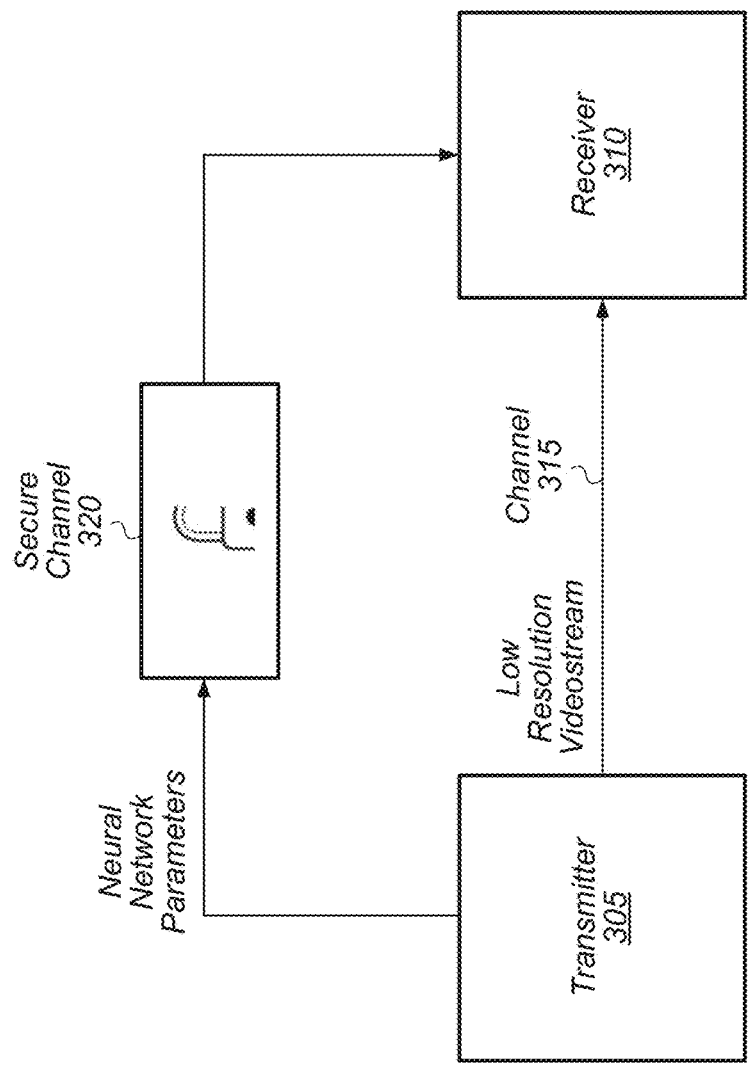
FIG. 3 is a block diagram of one embodiment of a system enabling secure communication.

Referring now to FIG. 3, a block diagram of one embodiment of a system 300 for secure communication is shown. In one embodiment, system 300 includes transmitter 305 and receiver 310. Transmitter 305 is coupled to receiver via channel 315 and via secure channel 320. In one embodiment, transmitter 305 conveys a low resolution videostream on channel 315 to receiver 310. In other embodiments, transmitter 305 conveys other types of data which includes some content which has been obscured. In one embodiment, transmitter 305 conveys neural network parameters over secure channel 320 to receiver 310. Receiver 310 utilizes the neural network parameters to program a neural network which then processes the low resolution videostream to create a high resolution videostream. In another embodiment, transmitter 305 conveys secure information inside an image which can only be unlocked via a properly trained neural network. Any third party which receives the image will be unable to decode the secure information without a neural network programmed by the neural network parameters sent over secure channel 320. This approach can help to protect secure data from unauthorized access by third parties.

Figure 4:
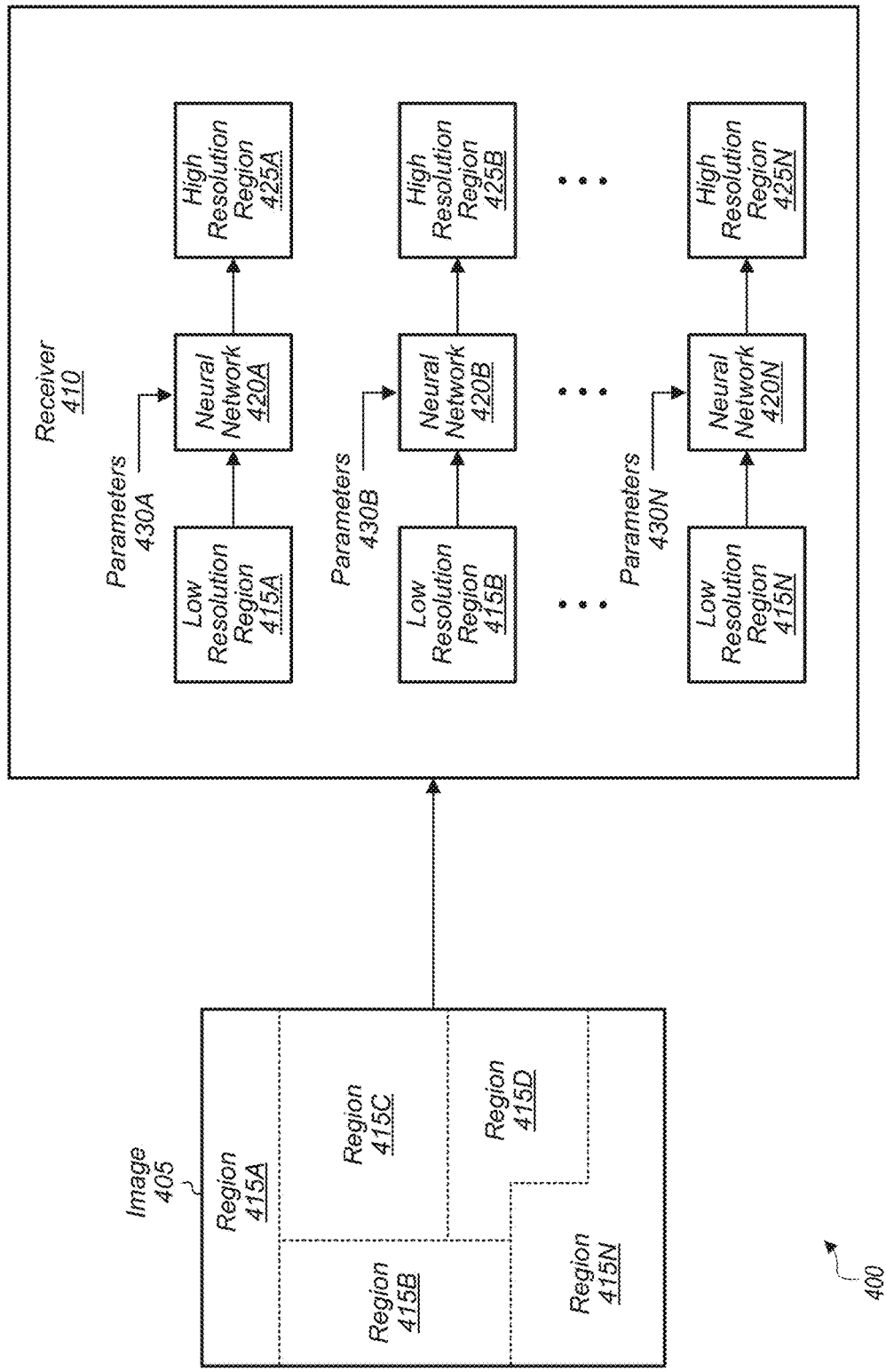
FIG. 4 is a block diagram of one embodiment of a system for partitioning an image into multiple regions.

Turning now to FIG. 4, a block diagram of one embodiment of a system 400 for partitioning an image 405 into multiple regions. In one embodiment, a transmitter (not shown) converts image 405 into a low resolution version of the image. Additionally, the transmitter partitions image 405 into a plurality of regions 415A-N. In one embodiment, the transmitter identifies different regions within image 405 that include similar features and then partitions image 405 into these different regions. The transmitter also generates a plurality of different parameters 430A-N for programming different neural networks, with a different set of parameters 430A-N for each region 415A-N of image 405. These regions 415A-N and parameters 430A-N are then sent to receiver 410. Receiver 410 uses each separate set of parameters 430A-N to program a different neural network 420A-N. Then, each low resolution region 415A-N is processed by a different neural network 420A-N to generate a corresponding high resolution region 425A-N.

Figure 5:
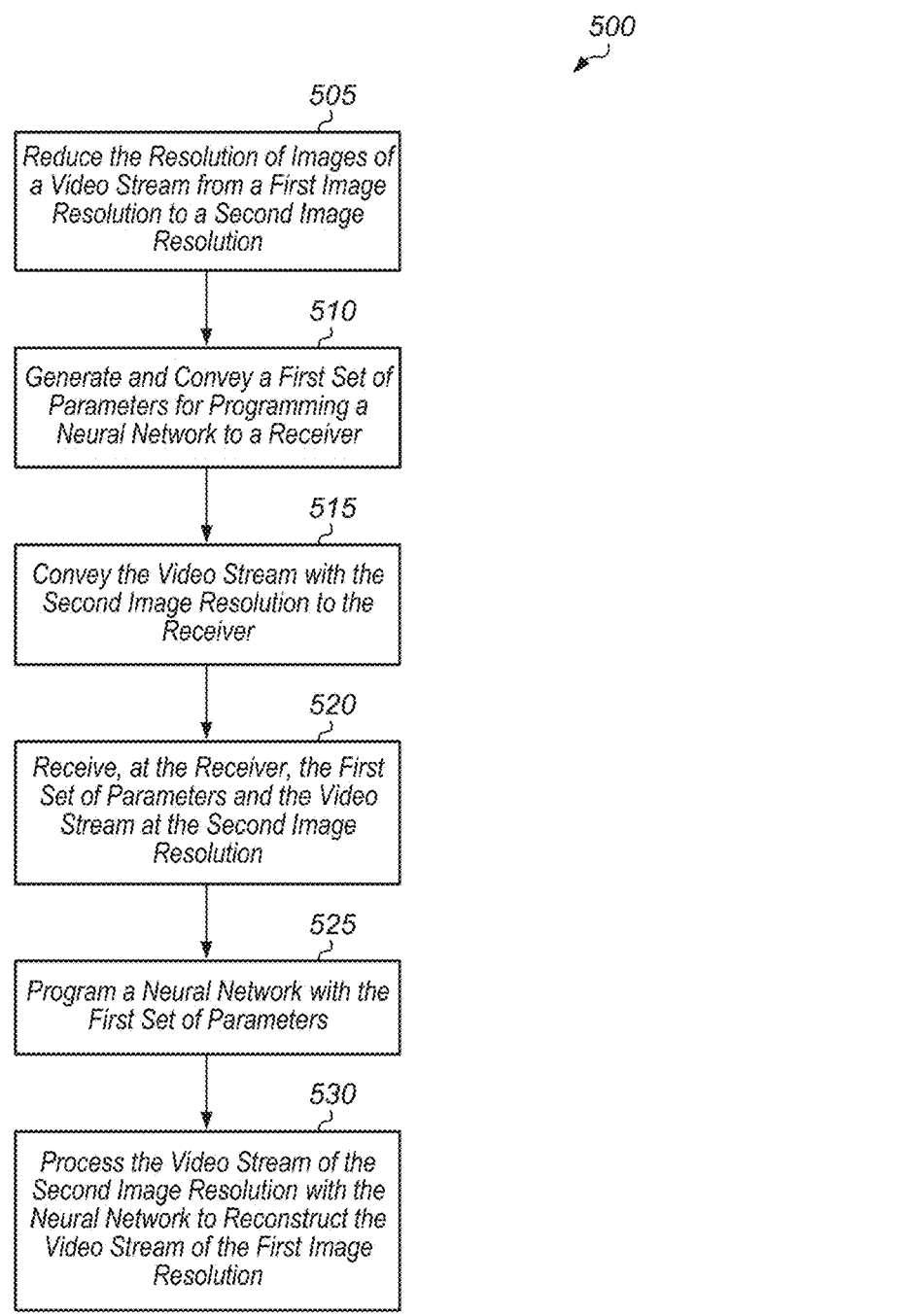
FIG. 5 is a generalized flow diagram illustrating one embodiment of a method for generating enhanced resolution video via machine learning.
Figure 6:
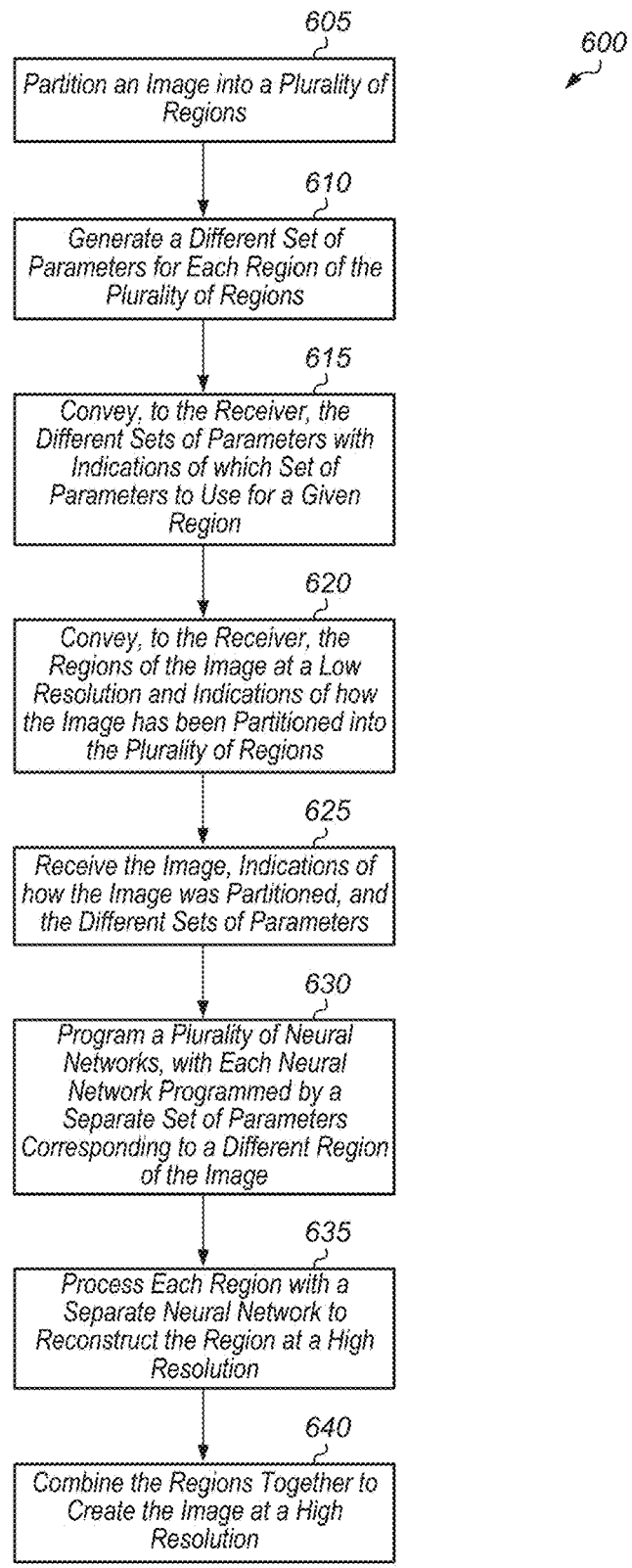
FIG. 6 is a generalized flow diagram illustrating another embodiment of a method for partitioning an image and reconstructing the high-resolution image from the low-resolution partitions.
Figure 7:
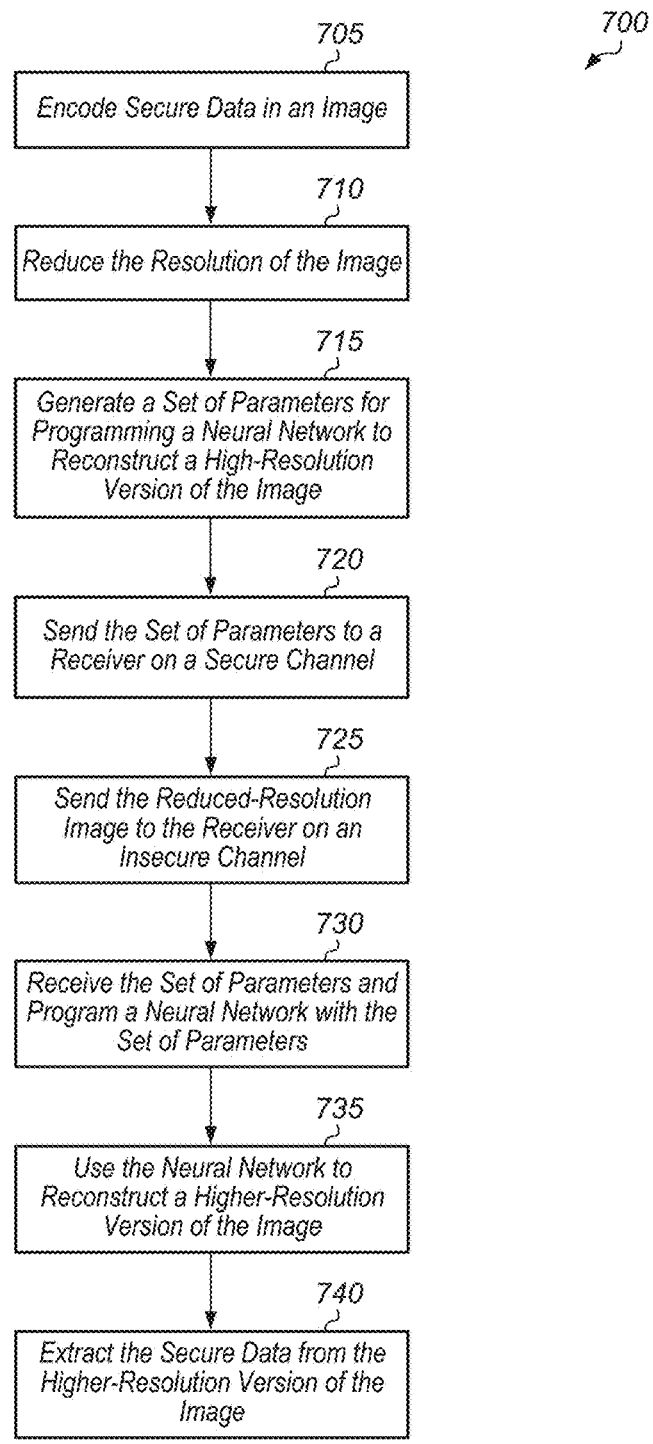
FIG. 7 is a generalized flow diagram illustrating one embodiment of a method for enabling secure communication.

Referring now to FIG. 5, one embodiment of a method 500 for generating enhanced resolution video via machine learning is shown. For purposes of discussion, the steps in this embodiment and those of FIGS. 6-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A transmitter reduces the resolution of images of a video stream from a first image resolution to a second image resolution (block 505). It is assumed for the purposes of this discussion that the second image resolution is lower than the first image resolution. For example, in one embodiment, the first image resolution is 64×64 pixels and the second image resolution is 16×16 pixels. The first and second image resolution can have other values in other embodiments.

Also, the transmitter generates and conveys a first set of parameters for programming a neural network to a receiver (block 510). Additionally, the transmitter conveys the video stream with the second image resolution to the receiver (block 515). The receiver receives the first set of parameters and video stream with the second image resolution (block 520). Next, the receiver programs a neural network with the first set of parameters (block 525). Then, the receiver processes the video stream of the second image resolution with the neural network to reconstruct the video stream of the first image resolution (block 530). After block 530, method 500 ends.

Turning now to FIG. 6, one embodiment of a method 600 for partitioning an image and reconstructing the high-resolution image from the low-resolution partitions is shown. A transmitter partitions an image into a plurality of regions (block 605). In one embodiment, the transmitter partitions the image into regions of similar features. For example, a first region can correspond to a face, a second region can show a group of trees, a third region can show the sky, and so on. The transmitter generates a different set of parameters for each region of the plurality of regions (block 610). Then, the transmitter conveys, to the receiver, the different sets of parameters with indications of which set of parameters to use for a given region (block 615). Also, the transmitter conveys, to the receiver, the regions of the image at a low resolution and indications of how the image has been partitioned into the plurality of regions (block 620).

The receiver receives the image, indications of how the image was partitioned, and the different sets of parameters (block 625). Next, the receiver programs a plurality of neural networks, with each neural network programmed by a separate set of parameters corresponding to a different region of the image (block 630). Then, the receiver processes each region with a separate neural network to reconstruct the region at a high resolution (block 635). Next, the receiver combines the regions together to create the image at a high resolution (block 640). After block 640, method 600 ends.

Referring now to FIG. 7, one embodiment of a method 700 for enabling secure communication is shown. A transmitter encodes secure data in an image (block 705). In one embodiment, the secure data is a key (e.g., encryption key). Next, the transmitter reduces the resolution of the image (block 710). Reducing the resolution of the image has the effect of obscuring the secure data, making the secure data unrecognizable in the reduced-resolution image. Next, the transmitter generates a set of parameters for reconstructing a high-resolution version of the image (block 715). The transmitter sends the set of parameters to a receiver on a secure channel (block 720). Depending on the embodiment, different types of secure channels can be utilized. In one embodiment, using a secure channel involves encrypting the set of parameters in a way that only the receiver can decrypt.

Also, the transmitter sends the reduced-resolution image to the receiver on an insecure channel (block 725). In one embodiment, the reduced-resolution image is sent over the Internet to the receiver.

Next, the receiver receives the set of parameters and programs a neural network with the set of parameters (block 730). Then, the receiver uses the neural network to reconstruct a higher-resolution version of the image (block 735). Next, the receiver extracts the secure data from the higher-resolution version of the image (block 740). After block 740, method 700 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a memory; and
   a processor coupled to the memory;
   wherein the system is configured to:
      receive, via a secure channel, a first set of parameters for programming a neural network;
      receive an image, via an insecure channel, wherein prior to being received, secure data has been encoded in the image and a resolution of the image has been reduced from a first image resolution to a second image resolution;
      program the neural network with the first set of parameters; and
      process the image of the second image resolution with the neural network to:
         reconstruct a version of the image with the first image resolution; and
         extract the secure data from the image with the first image resolution;
      wherein said secure data cannot be recovered without said parameters.

2. The system as recited in claim 1, wherein the image has been partitioned into a plurality of regions.

3. The system as recited in claim 2, wherein the system is further configured to:
   receive a plurality of sets of parameters, wherein a different set of parameters corresponds to each region of the plurality of regions;
   program a plurality of neural networks with the plurality of sets of parameters, with each neural network programmed by a separate set of parameters corresponding to a different region of the plurality of regions; and
   process each region of the plurality of regions with a separate neural network to reconstruct a version of the region of the first image resolution.

4. The system as recited in claim 3, wherein the system is further configured to combine the plurality of regions to reconstruct the version of the image of the first image resolution.

5. The system as recited in claim 1, wherein the secure data is obscured by reducing the image from the first image resolution to the second image resolution.

6. The system as recited in claim 5, wherein the system is further configured to extract the secure data from the version of the image of the first image resolution.

7. The system as recited in claim 1, wherein the image is part of a videostream.

8. A method comprising:
   receive, via a secure channel, a first set of parameters for programming a neural network;
   receive an image, via an insecure channel, wherein prior to being received, secure data has been encoded in the image and a resolution of the image has been reduced from a first image resolution to a second image resolution;
   programming the neural network with the first set of parameters; and
   processing the image of the second image resolution with the neural network to:
      reconstruct a version of the image with the first image resolution; and
      extract the secure data from the image with the first image resolution;
   wherein said secure data cannot be recovered without said parameters.

9. The method as recited in claim 8, wherein the image has been partitioned into a plurality of regions.

10. The method as recited in claim 9, further comprising:
    receiving a plurality of sets of parameters, wherein a different set of parameters corresponds to each region of the plurality of regions;
    programming a plurality of neural networks with the plurality of sets of parameters, with each neural network programmed by a separate set of parameters corresponding to a different region of the plurality of regions; and
    processing each region of the plurality of regions with a separate neural network to reconstruct a version of the region of the first image resolution.

11. The method as recited in claim 10, further comprising combining the plurality of regions to reconstruct the version of the image of the first image resolution.

12. The method as recited in claim 8, wherein the secure data is obscured by reducing the image from the first image resolution to the second image resolution.

13. The method as recited in claim 12, further comprising extracting the secure data from the version of the image of the first image resolution.

14. The method as recited in claim 8, wherein the image is part of a videostream.

15. An apparatus comprising:
    a memory;
    a processor; and
    a neural network;
    wherein the apparatus is configured to:
       receive, via a secure channel, a first set of parameters for programming the neural network;
       receive an image, via an insecure channel, wherein prior to being received, secure data has been encoded in the image and a resolution of the image has been reduced from a first image resolution to a second image resolution;

program the neural network with the first set of parameters; and process the image of the second image resolution with the neural network to:

reconstruct a version of the image with the first image resolution; and extract the secure data from the image with the first image resolution;

wherein said secure data cannot be recovered without said parameters.

16. The apparatus as recited in claim 15, wherein the image has been partitioned into a plurality of regions.

17. The apparatus as recited in claim 16, wherein the apparatus is further configured to:

receive a plurality of sets of parameters, wherein a different set of parameters corresponds to each region of the plurality of regions;

program a plurality of neural networks with the plurality of sets of parameters, with each neural network programmed by a separate set of parameters corresponding to a different region of the plurality of regions; and process each region of the plurality of regions with a separate neural network to reconstruct a version of the region of the first image resolution.

18. The apparatus as recited in claim 17, wherein the apparatus is further configured to combine the plurality of regions to reconstruct the version of the image of the first image resolution.

19. The apparatus as recited in claim 15, wherein the secure data is obscured by reducing the image from the first image resolution to the second image resolution.

20. The apparatus as recited in claim 19, wherein the apparatus is further configured to extract the secure data from the version of the image of the first image resolution.

* * * * *